United States Patent [19]

Jenkins

[11] Patent Number: 4,502,417

[45] Date of Patent: Mar. 5, 1985

[54] DOG DRIP UNIT

[76] Inventor: Curlee Jenkins, 5612 S. Hoyne Ave., Chicago, Ill. 60626

[21] Appl. No.: 618,568

[22] Filed: Jun. 8, 1984

Related U.S. Application Data

[63] Continuation-in-part of Ser. No. 336,682, Jul. 25, 1983.

[51] Int. Cl.$^3$ .............................................. A01K 23/00
[52] U.S. Cl. ...................................................... 119/95
[58] Field of Search ............................ 119/95, 96, 143

[56] References Cited

U.S. PATENT DOCUMENTS 3,875,903  4/1975  Sarvary .................................. 119/95

FOREIGN PATENT DOCUMENTS 691419  5/1953  United Kingdom .................. 119/95

Primary Examiner—Jay N. Eskovitz
Attorney, Agent, or Firm—Niblack & Niblack

[57] ABSTRACT

The present invention provides a pet dropping collection device comprising a body encircling friction locking clamp attachable and fixable to the rib-to-loin area of a dog, and having a pair of bushings horizontally mounted on the collar adapted to slidably mount a yoke which extends rearwardly parallel to the back of a dog. The collar has a centrally located journalled lock means to secure the collar about a dog. A yoke means is mounted on the clamp and includes a pair of substantially parallel arms which extend horizontally and rearwardly from the collar. The yoke includes a pair of descending arms which are attached to the parallel arms and are adapted to pass over and be supported by the rear flanks of a dog, and terminate in a perianal loop which joins the terminal ends of the descending arms below the tail of a dog. A receptacle is mounted within the loop and is secured thereto by retaining means. A flexible collection pouch having a mouth capable of being spread over the mouth of the receptable is removably received within the receptacle. The collection pouch is preferably disposable and includes closure means for closing the collection pouch prior to removal from the receptacle and disposal thereof.

5 Claims, 5 Drawing Figures

U.S. Patent  Mar. 5, 1985  4,502,417
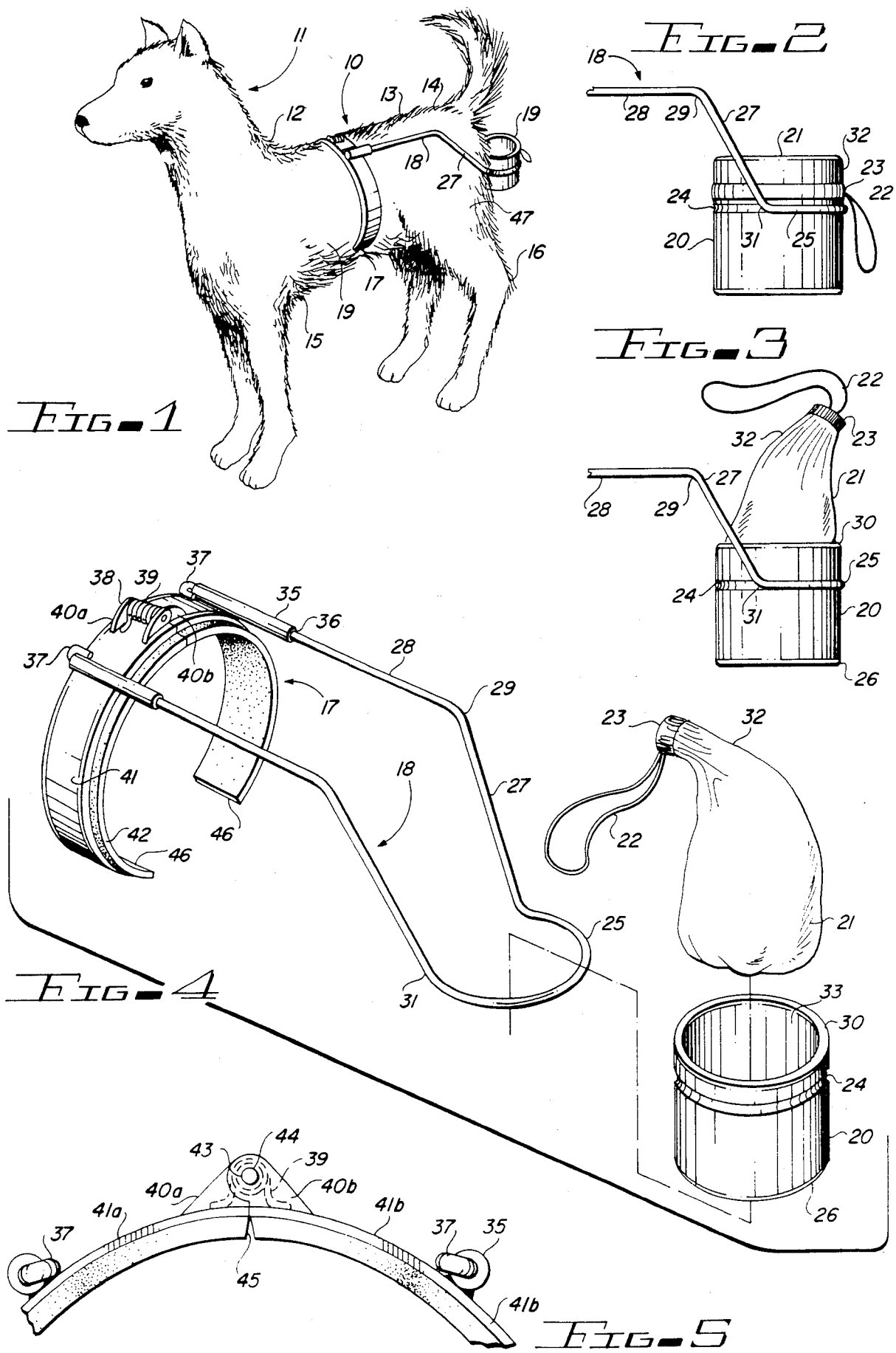

DOG DRIP UNIT

CROSS-REFERENCE TO RELATED APPLICATION

This application is a continuation-in-part of co-pending U.S. Ser. No. 06/336,682, filed July 25, 1983.

BACKGROUND

Collection and disposal of pet droppings is a constant problem, especially in metropolitan areas. In crowded cities, playgrounds, parks, sidewalks, curbs and even suburban and rural areas, it is a continuing and frequently emotional area of conflict between pet owners, people who do not own pets and are not sympathetic, and authorities. Many local laws require the removal or collection of such material. This sets property owners, officials, pet owners and the general public against each other.

Not only is it a continuing problem for pet owners to clean up after their pet while walking them, it is often inconvenient, impractical or impossible for dog owners who do not have fenced in yards to routinely walk their dogs, either because of inclement weather, poor health, etc. Thus, there is a need for a device which facilitates collection and disposal of a pet's waste materials.

The prior art has suggested various devices designed to facilitate collection and disposal of pet droppings. For example, U.S. Pat. No. 3,875,903 teaches a device which uses a collar encircling a pet's neck attached to a back strap which has leg and body straps which fasten to an elaborate tail-encircling assembly having a disposable pouch precisely retained by an annular open ring. This constitutes an elaborate, expensive and precision-requiring assembly that would be more practical if worn by a dog the majority of the time in view of the multiple fitments, adjustments, straps and buckles.

As the prior art has failed to provide a satisfactory solution to this problem, there has been a continuing need for a simpler, cheaper and more reliable device. The present invention provides one such solution.

SUMMARY OF THE DISCLOSURE

The present invention provides a pet dropping collection device comprising a body encircling friction locking clamp attachable and fixable to the rib-to-loin area of a dog, and having a pair of bushings horizontally mounted on the clamp adapted to slideably mount a yoke which extends rearwardly parallel to the back of a dog. The clamp has a centrally located journalled lock means to secure the clamp about a dog. A yoke means is mounted on the clamp and includes a pair of substantially parallel arms which extend horizontally and rearwardly therefrom. The yoke includes a pair of descending arms which are attached to the parallel arms and are adapted to pass over and be supported by the rear flanks of a dog, and terminate in a perianal loop which joins the terminal ends of the descending arms below the tail fo a dog. A receptacle is mounted within the loop and is secured thereto by retaining means. A flexible collection pouch having a mouth capable of being spread over the mouth of the receptable is removably received within the receptacle. The collection pouch is preferably disposable and includes closure means for closing the collection pouch prior to removal from the receptacle and disposal thereof.

BRIEF DESCRIPTION OF THE DRAWINGS

The present invention will be more fully understood by reference to the drawings, taken in conjunction with the detailed description, in which:

FIG. 1 is a perspective view of the device of this invention in place on a dog;

FIG. 2 is an elevational partial side view of the perianal portion of the yoke assembly with the collection pouch in open position.

FIG. 3 is an elevational partial side view of the yoke corresponding to FIG. 2 but having the pouch in a closed position for removal and disposal;

FIG. 4 is a perspective, enlarged and exploded view of the entire assembly; and

FIG. 5 is an elevational end view of the clamp showing detail of the clamp and lock construction.

DETAILED DESCRIPTION OF PREFERRED EMBODIMENTS

With detailed reference to the drawings, FIG. 1 depicts in perpective the pet droppings collection device 10 worn by a dog 11. Areas of dog 11 which will be referred to later are withers 12 at the front and brisket 15 located in the forequarters. Dog loin 13 lies behind rib cage 9 in central body portions while rump 14, hock 16 and rear flanks 47 are on the back portions of the pet body.

Overall device 10 generally comprises body clamp 17 which preferably partially encircles the girth of the pet, preferably behind the rib cage 9 and over or in front of the loin section 13; yoke 18 fastened to clamp 17 and passing horizontally to the back of the dog, turning downwardly by having descending arms 27 passing over the rear flanks 47 while slightly converging and terminating in a substantially horizontal collection assembly 19 which is suspended in a plane below the perianal area and above the hock level.

In FIG. 2, an enlarged elevational view of the collection portions of the device and the rear portion of the yoke 18 of FIG. 1 is depicted. Yoke loin bar 28 is one of the substantially parallel and horizontally placed first pair of arms supported along the dog's back in operation. At loin elbow 29, the yoke turns downwardly as second pair or descending arms 27 converging slightly on either exterior side of the dog's rear flanks to hoop elbow 31 at which point horizontal perianal loop 25 forms the terminus of the yoke. Removably or permanently fastened within arcuate hoop 25 is retaining cup 20 which is preferably rigid. While cup 20 can be friction-fit suspended or fixed by soldering or glueing, it is preferably snapped or otherwise affixed by mating with hoop 24 shown as an indented band 24 in FIGS. 2,3 and 4. However, the circumferential support means may be also be formed by use of a raised bead or ridge or interrupted embossed or debossed nubs and the like. If thin gauge plastic is used to fabricate the cup, it is often desirable to provide raised ledges or rings for increased strength.

Flexible pouch 21 lines cup 20 with pouch throat 32 stretched around the cup mouth and placed taut thereon by constricting pouch mouth 23 by drawstring 22. Cup floor 26 is preferably closed and and continuous but it may consist of a retaining lip of sufficient width to support pouch 21 in use but narrow enough to form an open bottom to aid in cleaning the cap and reduce its weight without sacrificing structural strength.

FIG. 3 is a companion view of FIG. 2 depicting the pouch in closed position for removal and disposal. In this phase, pouch mouth 23 and throat 32 are lifted from the cup finish 30 by pulling up on drawstring 22 and constricting the mouth closure.

In FIG. 4, the cup and pouch are shown in exploded form and the entire device is shown in perspective. Clamp 17 is attached to yoke 18 by yoke bushings 35 which are oriented substantially parallel to each other. The yoke is anchored by keepers 37 at the end of each loin yoke bar 28. FIG. 4 shows the loin bars 28 locked in ferrules or bushings 35. To add greater adjustability to the arms telescoping rods may be used or the rods can be made slideable by removel of the keepers. These are expedients that will become clear to those skilled in the fabrication field. Bushings 35 end in chamfered sections 36 which ensure greater comfort to the pet and less risk of injury to those fitting or removing the clamp.

Continuing in FIG. 4 clamp 17 is formed by two opposing arcuate shoes 41 which are backed by resilient liner 42 having beveled margin 46 at its lower edges which contact the pet abdomen in use. Shoes 41 are joined by clamp lock 38 attached thereon by mounting ridges 40 at each edge of the shoe. Inward constricting tension is provided by torsional helix spring 39.

Yoke 18 is best shown in FIG. 4 with loin bars 28 fixed or slideably mounted in bushings 35 in parallel and horizontal alignment, the dropping and converging at loin elbow 29, through descending arms 27 to hoop elbows 31 and ending in arcuate or angled hoop 25 adopted and sloped to match with, hold in an overall vertical position and removably secure cup 20. The cup preferably has smooth edged finish 30 and relatively smooth moisture impervious interior wall 33.

As best shown in FIG. 5, clamp shoes 41a and 41b carry yoke bushings in mirror alignment. The interior of the shoes preferably carry resilient layer 42 of padding over their interior to contact the pet when in place. At the junction of the shoes, hinge sleeve 43 is attached to one shoe by mounting ridge 40a on the upper margin of one shoe while bolt 44 is inserted through sleeve 43 and is fixed to the second shoe by mounting ridge 40b. Helix torsion spring 39 surrounds the bolt and sleeve completed hinge assembly and the spring ends each bear on one of the shoes to urge the clamp inwardly. Liner notch 45 is provided in the clamp center to prevent contact of the liner segments before the clamp is almost completely closed thus eliminating bunching of the liner and premature diminution of the spring force.

Among the variables that can be employed in fabricating the device of this invention is the configuration of the perianal yoke hoop 25. While the shape of the cup and the hoop in FIG. 4 is depicted as annular, it is often desirable to provide a cup having at least one flat segment which rests against the pet's rearquarters. Thus a cross-sectional hemisphere shape is a desirable form. A square or rectangular cross-section cup is also highly desirable. The flat segment of the side of the cup that conforms to and contact the animal's body ensures that the hoop supporting it and the receptacle are snugged into the animal's body and not unduly extended outwardly to the rear. The retaining ridge or snap groove of the cup and the configuration of the hoop can be easily modified to accommodate the cup of choice. If a rectangular cup is desired, the hoop is then ordinarily bent to a U-shaped outline.

The yoke frame can be readily fabricated from stainless steel wire or rod stock. Ordinarily a thin width is best to conserve weight and cost. A wire diameter of 3/64 inch is suitable for a medium size dog yoke. Using that diameter, the bushings 35 are conveniently formed from stainless steel pipe having an outside diameter of 5/16 inch and inside diameter of ⅛ inch.

The clamp is also preferably formed of stainless steet strip about 1 inch wide and ⅛ inch thick for a medium sized dog. Length is dependent on the pet size, but arcuate shoes of 5 to 8 inches is adequate for most sizes of dogs. It is important for utility considerations and animal confort to provide a slip-resistant material and resilient or padded clamp interior. Rubber-like surfaces and compressible material such as weatherstripping of suitable width is an example of usable lining material. A smooth metallic clamp interior is unsuitable as it tends to slip over the animal's hair unless undue spring pressure is brought to bear on the animal.

Custom adjustment of the size of the device to suitably fit a pet is preferred. However, by supplying telescoping rod arms in the yoke and adding extendible members to the shoes, the device may be adequately adjusted to fit all sizes of common companion animals including dogs. The clamp bushings can be easily fabricated to slidably house the parallel arms and provide rapid adjustability.

From the foregoing description, it will be apparent that numerous variations and modifications may be effected without departing from the spirit and true scope of the invention. It is intended to embrace by this invention all variations and modifications that fall within the scope of the appended claims.

The invention claimed is:

1. A pet droppings collection device comprising:
    a friction clamp adapted to encircle a portion of the girth of a pet along the rib-to-loin area, and having a pair of bushings horizontally mounted on the clamp adapted to slide mounting of a yoke, and having a centrally located hinge lock to secure the clamp about the pet;
    a yoke mounted on the clamp and having a pair of substantially parallel arms extending horizontally and rearwardly from the clamp, said yoke having a pair of descending arms attached to said parallel arms adapted to pass over and be supported by the rear flanks of a pet, and terminating in a perianal loop joining said descending arms below the type of a dog;
    a rigid receptacle mounted within the loop having a circumferential mating member with said loop to removably hold the receptacle therewithin;
    a flexible collection pouch with draw string mouth positioned within the receptacle and having a mouth capable of being spread open over the receptacle finish in the receiving position and being closable by said draw string for removal and disposal.

2. The collection device of claim 1 wherein said clamp encircles a major portion of the girth of said pet.

3. The device of claim 1 wherein the clamp is comprised of a pair of arcuate rigid shoes adapted to encircle a major portion of the circumference of the loin of a dog, said shoes having interior slip-resistant resilient lining positioned to contact the body of the dog in place.

4. The device of claim 1 wherein the yoke is formed by a continuous piece of rigid rod stock having equal parallel and horizontal end portions, equal length converging descending arm sections and having a center horizontal loop conforming in shape to the cross-section of the receptacle.

5. A pet droppings collection device comprising:
a friction clamp adapted to encircle a major portion of the girth of a dog over the rib-loin circumference, the clamp being formed by the joinder of a pair of arcuate rigid shoes of substantially equal length hinged by helix spring means urging together the opposing ends of the shoes;
a pair of parallel and generally horizontally disposed ferrules affixed in mirror alignment to the clamp;
resilient and slip-resistant padding means attached to the interior surface of said clamp and having a void formed under the spring means to thereby avoid padding contact on each shoe when the clamp is fully compressed;
a yoke formed by a continuous rod member having two ends, each of said ends being fixedly set within a ferrule, a first arm pair extending in parallel relation and rewardly along a dog's back when worn in place, a pair of second arms attached to said first arms descending and converging being supported by the dog's rear flanks and terminating in a symmetrical loop;
a receptacle vertically disposed within and supported by said loop in perianal alignment to the dog at a height above the dog hocks and below the tail, said receptacle having a vertical sector conforming to and contacting the dog's body, and circumferential support means on said receptacle mating with said loop to removable hold the receptacle in place;
a flexible receiving pouch having a mouth adapted to be spread over the open top of the receptacle and positioned within said receptacle to form a removal liner therefor, a drawstring closure means cooperating with said mouth adapted to close and facilitate removal of the pouch from said receptacle.

* * * * *